(12) United States Patent
Comeaux et al.

(10) Patent No.: US 6,991,028 B2
(45) Date of Patent: Jan. 31, 2006

(54) THERMAL RESERVOIR FOR TWO-PIPE HYDRONIC AIR-CONDITIONING SYSTEM

(76) Inventors: Vernal J. Comeaux, 358 Andres Rd., Scott, LA (US) 70583; Chris D. Morgan, 275 Saul Dr., Church Point, LA (US) 70525

( * ) Notice: Subject to any disclaimer, the term of this patent is extended or adjusted under 35 U.S.C. 154(b) by 0 days.

(21) Appl. No.: 10/767,797

(22) Filed: Jan. 29, 2004

(65) Prior Publication Data
US 2005/0167092 A1    Aug. 4, 2005

(51) Int. Cl.
*F24F 5/00* (2006.01)
*F24H 7/04* (2006.01)
*F25B 29/00* (2006.01)

(52) U.S. Cl. ............... 165/219; 165/218; 165/220; 165/221; 165/236; 165/50

(58) Field of Classification Search ............... 165/236, 165/50, 218, 219, 220, 221
See application file for complete search history.

(56) References Cited

U.S. PATENT DOCUMENTS

| | | | | |
|---|---|---|---|---|
| 3,384,155 A | * | 5/1968 | Newton | 165/219 |
| 3,425,485 A | * | 2/1969 | Newton | 165/218 |
| 3,906,742 A | * | 9/1975 | Newton | 62/332 |
| 4,135,571 A | * | 1/1979 | Tamblyn et al. | 165/236 |
| 4,226,364 A | * | 10/1980 | Utesch | 165/218 |
| 4,479,352 A | * | 10/1984 | Yamaoka et al. | 60/659 |
| 4,590,992 A | * | 5/1986 | Tamblyn | 165/104.19 |
| 6,584,785 B1 | * | 7/2003 | Karl | 62/196.4 |

* cited by examiner

*Primary Examiner*—John K. Ford
(74) *Attorney, Agent, or Firm*—Lemoine & Associates LLP

(57) ABSTRACT

A thermal reservoir for a two-pipe hydronic air-conditioning system is disclosed. Said thermal reservoir includes a well-insulated tank for alternatively storing hot and cold water. Said thermal reservoir contains plurality of valves for directing hot water stored therein into the two-pipe hydronic air-conditioning system, thereby causing cold water within the two-pipe hydronic air-conditioning system to be displaced therefrom and into well insulated storage tank. Said process is fully reversible in that cold water displaced from the two-pipe hydronic air-condition system into said thermal reservoir may be subsequently directed from the thermal reservoir and restored to the two-pipe hydronic air-conditioning system and hot water therefrom directed back into storage. Accordingly a two-pipe hydronic air-conditioning system may be switched between heating and cooling modes with rapidity and without waste of the energy content of said hot water and said cold water.

12 Claims, 8 Drawing Sheets

THERMAL RESERVOIR FOR TWO-PIPE HYDRONIC AIR-CONDITIONING SYSTEM

BACKGROUND—FIELD OF THE INVENTION

In the art of heating, cooling and otherwise "conditioning" the air of buildings, "two-pipe" hydronic systems are known. In such systems either hot or cold water, typically from a central location, is circulated about a piping loop. Fluidly attached to said loop, and disposed in zones of the building the air of which is to be conditioned, are a plurality of water-to-air heat exchangers. By regulating the amount of water and/or air which is passed through a particular water-to-air heat exchanger the air of the associated zone may be warmed or alternatively cooled a desired amount. The invention disclosed and claimed herein relates to a thermal reservoir means whereby water stored in said thermal reservoir at one temperature (for instance cold) may be used to reversibly displace water circulating about the piping/heat exchangers at a different temperature (for instance hot) circulating about said piping/heat exchangers, thereby permitting rapid switching of a two-pipe hydronic air-conditioning system between heating and cooling modes while conserving the energy content of both the stored and circulating water.

BACKGROUND—DESCRIPTION OF RELATED ART

In the art of heating or cooling the air of buildings, hydronic systems are well known. In such systems, means, typically from a central location disposed in or near the building, is provided with means, typically called a "boiler," to heat water and means, typically called a "chiller," to cool water. In such system the "hot" or "chilled" water is circulated about one or more loops of piping containing water-to-air heat exchangers (commonly called "coils") which are disposed in "zones" the air of which is to be heated or cooled. By regulating (typically by thermostatic means) the amount of hot or chilled water which is permitted to pass through the interior of the water-to-air heat exchanger of a particular zone, and/or by regulating the amount of air forced over the exterior of said water-to-air heat exchanger, the temperature of the air of a particular zone can be selected.

Hydronic air-conditioning systems are typically classified into two general types, namely "four-pipe" and "two-pipe" systems. The essential difference between these systems is that four-pipe systems are comprised of two separate piping loops, one of which carries heated water and the other of which carries chilled water. Whereas a two-pipe system (sometimes called a one-pipe system) is comprised of only one loop of water piping. Said system has a supply line and a return line, thus is most often referred to as a "two-pipe" system. Accordingly, while hot and cold water are typically always available for immediate use in a four-pipe hydronic air-conditioning system, in a two-pipe hydronic air-conditioning system either hot or cold water is available for use at any particular time.

A four-pipe system has certain advantages. Since both hot and chilled water may be circulated simultaneously in such system, the air of some zones of the building may be heated while others are being cooled. In addition thereto, switching a zone between heating and cooling can be accomplished rapidly, by simply changing the water-to-air heat exchanger of that zone to using water circulating in the opposite piping loop. However, a four-pipe hydronic air-conditioning system, which in essence may be considered substantially "dual" two-pipe systems, has various disadvantages, including but not limited to greater initial cost and additional operating and maintenance expenses.

On the other hand, a two-pipe system has certain advantages. Namely it requires only about half the piping of a four-pipe system, the water-to-air heat exchangers and valves are of simpler construction and normally either the boiler or chiller is operated (not both), thereby reducing op rating costs. However a two-pipe system has certain disadvantages, two of which are a significant time delay and energy waste which occurs when a two-pipe hydronic air-conditioning system is switched from heating to cooling mode (or the reverse). For instance, when such a system is in the heating mode, water in the range of 180 Degrees Fahrenheit is circulating in the piping and water-to-air heat exchangers of the system. When switching such system to the cooling mode, that water must be brought to a temperature of approximately 40 Degrees Fahrenheit for efficient air cooling to take place. That change of water temperature (by circulation through the system chiller) not only takes a significant length of time to accomplish, but in said process the energy invested in heating the water to about 180 Degrees Fahrenheit is lost, and running of the chiller for said purpose consumes significant amounts of energy to make such temperature reduction. When switching a two-pipe hydronic air-conditioning system from cooling to heating, a reverse temperature transition must occur producing similar time delay and energy waste. Moreover, during the significant time when temperature of the water is in transition, the temperature of the air in the building cannot be heated or cooled as desired. Both this waste of energy and time delay are, of course, highly undesirable.

While switching a two-pipe hydronic air-conditioning system from heating to cooling (or the reverse) might be more rapidly accomplished if an "over-sized" boiler and chiller were used, that solution has disadvantages, including but not necessarily limited to, additional space such equipment may consume, greater cost and maintenance of larger system components and higher peak demand such larger equipment will typically impose on the utility system which power them (which in some cases will result in a higher overall utility rate structure being imposed on the owner/tenant of the building). Moreover use of over-sized equipment does not solve the energy loss inherent in switching a two-pipe hydronic air-conditioning system from heating to cooling (or the reverse).

A two-pipe hydronic air-conditioning system will usually contain between several hundred to a few thousands of gallons of water in circulation. There is substantial investment of energy resources in heating that water to approximately 180 degrees Fahrenheit. Not only is that investment of energy "lost" when hot water in the system is then cooled, cooling it requires consumption of additional energy resources. It will be recognized that the same problem is presented when switching a two-pipe hydronic system from cooling to heating. It will be recognized that the aforementioned disadvantages can become acute during seasonal climatic changes, where switching from heating to cooling modes (and the reverse) may sometimes be required on a daily, or even more frequent basis. For instance, during climatic changes it may well be possible for heating to be required at night but cooling during the day. Therefore, for instance, during the day, it may take such a long time to switch from heating to cooling (sometimes several hours), that by the time efficient cooling conditions take place, during which air temperature in the building may not be able to be cooled as desired, it is almost time to switch the system back to night-time heating mode. In this switching back and forth between heating and cooling modes, substantial quantities of energy can be wasted, and air-temperature in the building neither heated or cooled as desired throughout large parts of a 24-hour period of time.

The invention disclosed and claimed herein is directed to resolving the aforementioned disadvantages of a two-pipe hydronic air-conditioning system. By providing the thermal reservoir and associated valving, hot water circulating in the piping and water-to-air heat exchangers of a two-pipe hydronic air-conditioning system may be speedily recovered into insulated thermal reservoir and replaced with cold water from said reservoir (and the reverse), thereby enabling rapid switching of a two-pipe hydronic air-conditioning system between h ating and cooling modes (and the reverse) without unnecessary waste of energy and avoiding the problems posed by oversized heating and cooling means.

OBJECTS OF THE INVENTION

The general object of the invention disclosed and claimed herein is to provide an improved two-pipe hydronic air-conditioning system, namely to provide one which may be rapidly switched between heating and cooling modes (and the reverse) without unnecessary waste of energy resources. The invention is intended to reduce both the time and energy waste associated with switching said systems between heating and cooling modes (and the reverse). In addition thereto, an object of the invention herein disclosed and claimed is to provide a means for rapidly switching a two-pipe hydronic air-conditioning system from heating to cooling, and the reverse, without the necessity of over-sizing the heating and cooling means of said system. Yet another object of the invention is to be able to affect rapid switching of a two-pipe hydronic air-conditioning system without increasing peak demand for energy utilized by said system.

More directed to the means by which the above general objects are accomplished by the invention disclosed and claimed, a general object of the invention is to provide a thermal reservoir and associated valves for a two-pipe hydronic air-conditioning system whereby water in the piping and water-to-air heat exchangers of the system (at one temperature) may be exchanged with water stored in the thermal reservoir (at a different temperature) and the water recovered from the piping and water-to-air heat exchangers of the system directed into the thermal reservoir for subsequent reuse thereof. Namely the object of the invention is to provide a means whereby when switching the system from heating to cooling mode, hot water (typically in the range of 180 Degrees Fahrenheit) may be facilely displaced from the piping and water-to-air heat exchangers of the system into a thermally efficient storage tank and replaced by pre-stored chilled water (typically in the range of 40 Degrees Fahrenheit) from the thermal reservoir. A further object of the invention is also to provide a fully reversible system, which operates in substantially reverse fashion when switching from cooling to heating as is does when switching from heating to cooling. Yet a further object of the invention is to provide a thermal reservoir and valving means which is facile to use, thermally efficient, durable and may be easily retrofitted into existing two-pipe hydronic air-conditioning systems or included therein during original installation thereof. Means may be provided to automatically operate the valves of the invention in appropriate sequence. Means may be optionally provided for maintaining the water of the thermal reservoir at a desired temperature.

SUMMARY OF THE INVENTION

The above and further objects are achieved in accordance with the present invention wherein there is provided a two-pipe hydronic air-conditioning system having a thermal reservoir, whereby water stored therein, at one temperature, may facilely be exchanged with water, at a different temperature, circulating in the system and water recovered from circulation stored for subsequent reuse. Well insulated storage tank means is used to form a thermal reservoir. Valve means are used to simultaneously cause water from the piping and water-to-air heat exchangers of a two-pipe hydronic air-conditioning system to be directed into a thermal reservoir as water from the thermal reservoir is directed therefrom and into said piping and water-to-air heat exchangers, without substantial mixing of hot and cold water.

When the two-pipe hydronic air-conditioning system is operating in the heating mode, hot water (typically in the range of about 180 Degrees Fahrenheit) is circulating within the piping and water-to-air heat exchangers of the system, and, the thermal reservoir of the invention will contain substantially cooler water (preferably at the temperature which is optimum when the system is operating in the cooling mode, about 40 Degrees Fahrenheit). When switching the two-pipe hydronic air-conditioning system from heating to cooling, valving is used to direct hot water, which is in the piping and water-to-air heat exchangers of the system, into a well insulated tank means, and cold water in an insulated tank means is simultaneously directed into the piping and water-to-air heat exchangers of the system. When the hot water has been fully displaced from the system and into an insulated water tank, valving may be used to isolate hot water in the well insulated tank means from the remainder of the system, thereby conserving the energy content thereof for subsequent use at a later time. When switching the system from cooling to heating a substantially reverse process is employed, namely cold water circulating in the system (the piping and water-to-air heat exchangers thereof) is directed into a thermal reservoir (well insulated tank means) and hot water from a thermal reservoir is directed into circulation.

In the preferred embodiment of the invention, a water tank, divided by a movably disposed piston may be used to store hot and/or cold water without mixing thereof. In other embodiments of the invention separate tanks may be provide to store hot or cold water.

BRIEF DESCRIPTION OF THE DRAWINGS

The invention will be better understood by reference to the accompanying drawings wherein.

DESCRIPTION OF THE PREFERRED EMBODIMENT OF THE INVENTION

While the present invention will be described with reference to preferred embodiments, it will be understood by those who are skilled in the art that various changes may be made and equivalents may be substituted for elements thereof without departing from the scope of the invention. In addition, many modifications may be made to adapt a particular situation or material to the teachings of the invention without departing from the essential scope thereof. It is therefore intended that the present invention not be limited to the particular embodiments disclosed as the best mode contemplated for carrying out this invention, but that the invention will include all embodiments and legal equivalents thereof which are within the scope of the appended claims.

Figure 1:
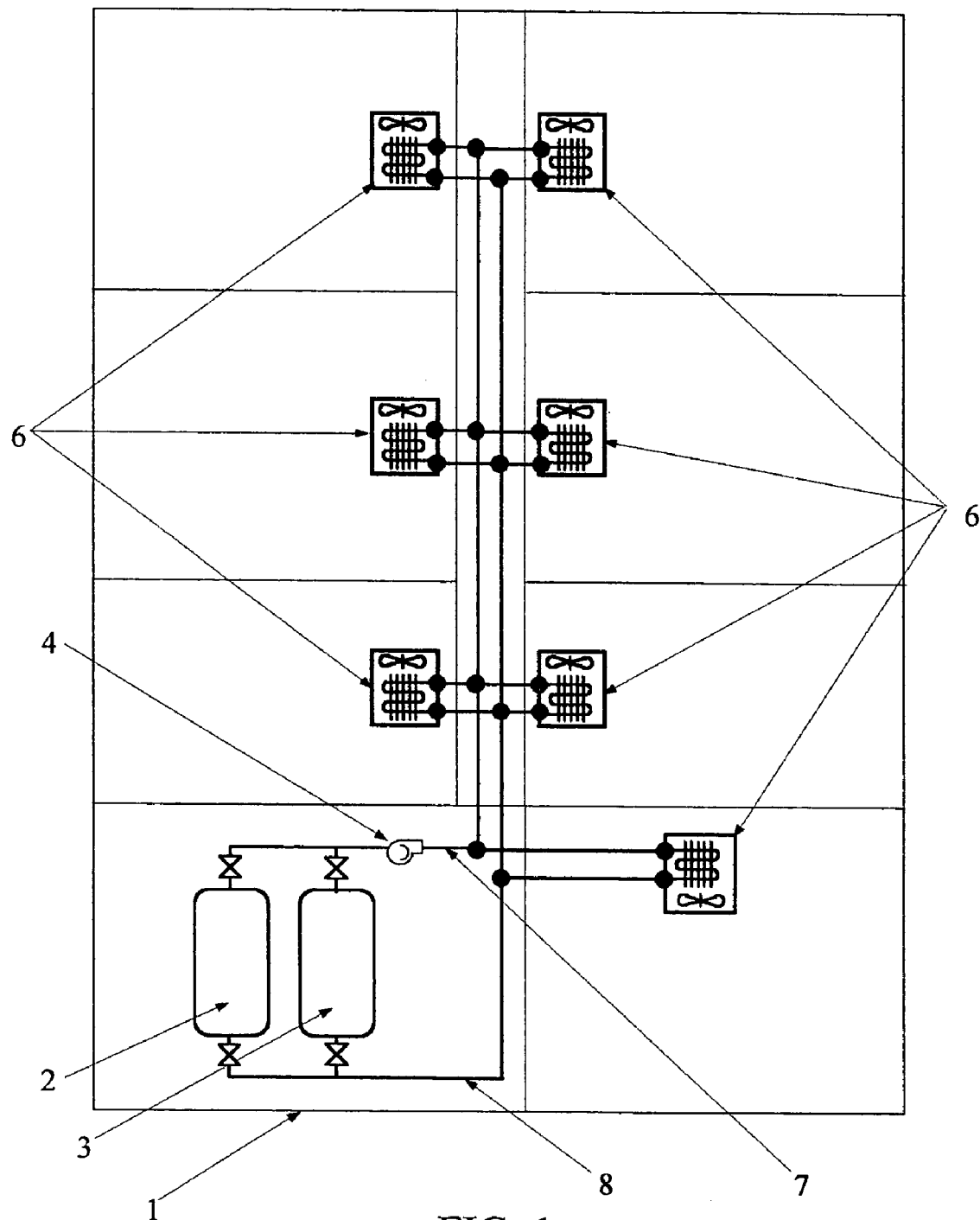
FIG. 1 is a schematic representation of a two-pipe hydronic air-conditioning system of prior art.

"Two-pipe" hydronic air-conditioning systems, such as schematically represented in FIG. 1 are known. Such systems are generally used in buildings having multiple zones where individual control of the amount of heating, or alternatively cooling, of the air of each zone is desired. Depending on the size of the rooms in a building, a zone may comprise part or all of a room or several rooms. In such systems either "hot" (generally in the range of about 180 Degrees Fahrenheit) water, or alternatively "cold" water (generally in the range of about 40 Degrees Fahrenheit) is generated in a "utilities" room 1 which is typically located in, adjacent or near the building, the air of which is to be "conditioned" (either heated or cooled, to a desired range, usually in a range of about 65 to 75 Degrees Fahrenheit). Those skilled in the art will know various means for producing hot water. In common parlance such heating means 2 are often referred to as the "boiler" (even though they do not usually heat water to boiling point). Likewise those skilled in the art will know various means for producing cold water. In common parlance said cooling means 3 are often referred to as the "chiller."

Characteristic of a two-pipe hydronic air-conditioning system is that either hot or cold water, but not simultaneously both, can be circulated from said utilities room 1 (from either the boiler 2 or chiller 3) about a loop of piping, which loop of piping includes supply line 7, return line 8 and water-to-air heat exchangers 6 (commonly called "coils"). By regulating the amount of water which passes through each water-to-air heat exchanger 6, or the amount of air blown over said water-to-air heat exchanger 6, the air temperature of each zone may be established as desired (typically in the range of 65 to 75 Degrees Fahrenheit for zones which are inhabited by humans). Following passage of water through a water-to-air heat exchanger 6, heat is drawn from or absorbed by said water and returns through return line 8 back to boiler 2 or chiller 3 for additional heating or cooling. When in the heating mode, water from the boiler 2 is typically about 180 Degrees Fahrenheit. When in the cooling mode, water from the chiller 3 is typically about 40 Degrees Fahrenheit.

Those skilled in the art of present two-pipe hydronic air-conditioning systems will recognize that there are certain limitations of such systems. Namely when hot water is circulating about a two-pipe hydronic system, while the amount of air heating in a particular zone may be increased or decreased, the hot water (typically about 180 Degrees Fahrenheit) may not be used to actually cool air of the zone (typically in a range of about 65 to 75 Degrees Fahrenheit). Likewise when a two-pipe hydronic air conditioning system is in the cooling mode (namely cold water, about 40 Degrees Fahrenheit), the cold water cannot elevate the temperature of air of a zone, which is typically in the range of about 65 to 75 Degrees Fahrenheit. Rather, when a two-pipe hydronic air-conditioning system is in the heating mode, and the weather changes make air in the building too warm, the whole system must be switched from heating to cooling mode. The reverse occurs when the two-pipe hydronic system is in the cooling mode and the weather turns cold. While upon first consideration switching an air-conditioning system from heating to cooling mode, or the reverse, might not seem to pose any substantial problems, such problems do exist. Because of "thermal inertia" inherent in several hundred to several thousands of gallons of water circulating in the two-pipe hydronic air-conditioning system, there are in fact two problems associated with switching between heating and cooling modes (or the reverse). Namely changing the temperature of water in the system by approximately 140 Degrees Fahrenheit consumes both energy excessive resources and time. Both of these problems are particularly acute during seasonal weather changes which result in large changes in air temperature over a short course of time, possibly requiring change from heating to cooling and/or the reverse several times a week, or even over the course of a single day. Depending on such weather changes it is quite possible for heating to be needed at night and cooling during the day. In such conditions switching from heating to cooling can take several hours, resulting in substantial waste of energy and several hours of discomfort during each switch-over. While over-sizing the boiler and chiller might reduce the time for switch-over, that solution does not solve the waste of energy which occurs during switch-over and has a plurality of other significant disadvantages, including but not limited to increased capital investment for larger equipment and space to contain and operate it, inefficiencies which frequently result in use of over-sized equipment for short duty cycles, possible imposition of a higher utility rate structure and other disadvantages associated with over-sized equipment.

A better solution to both of these problems is presented by the invention herein disclosed and claimed. Provided herein is a thermal reservoir where cold or alternatively hot water may be stored in fluid isolation from water circulating within the piping (supply line 7 and return line 8) and water-to-air heat exchangers 6 of the system and exchanged with water circulating in the system when the system is switched between heating and cooling modes. For instance, when hot water is circulating about the two-pipe hydronic air-conditioning system (the system is in "heating" mode), chilled water, earlier drawn from the system, is held in reserve.

Therefore, when switching the system to the "cooling" mode, same may be rapidly accomplished, without significant loss of energy, by directing chilled water from storage and into the system and directing hot water in the system into storage. Following such exchange hot water is maintained in reserve for return to the system when the system is switched back to the "heating" mode.

Figure 2:
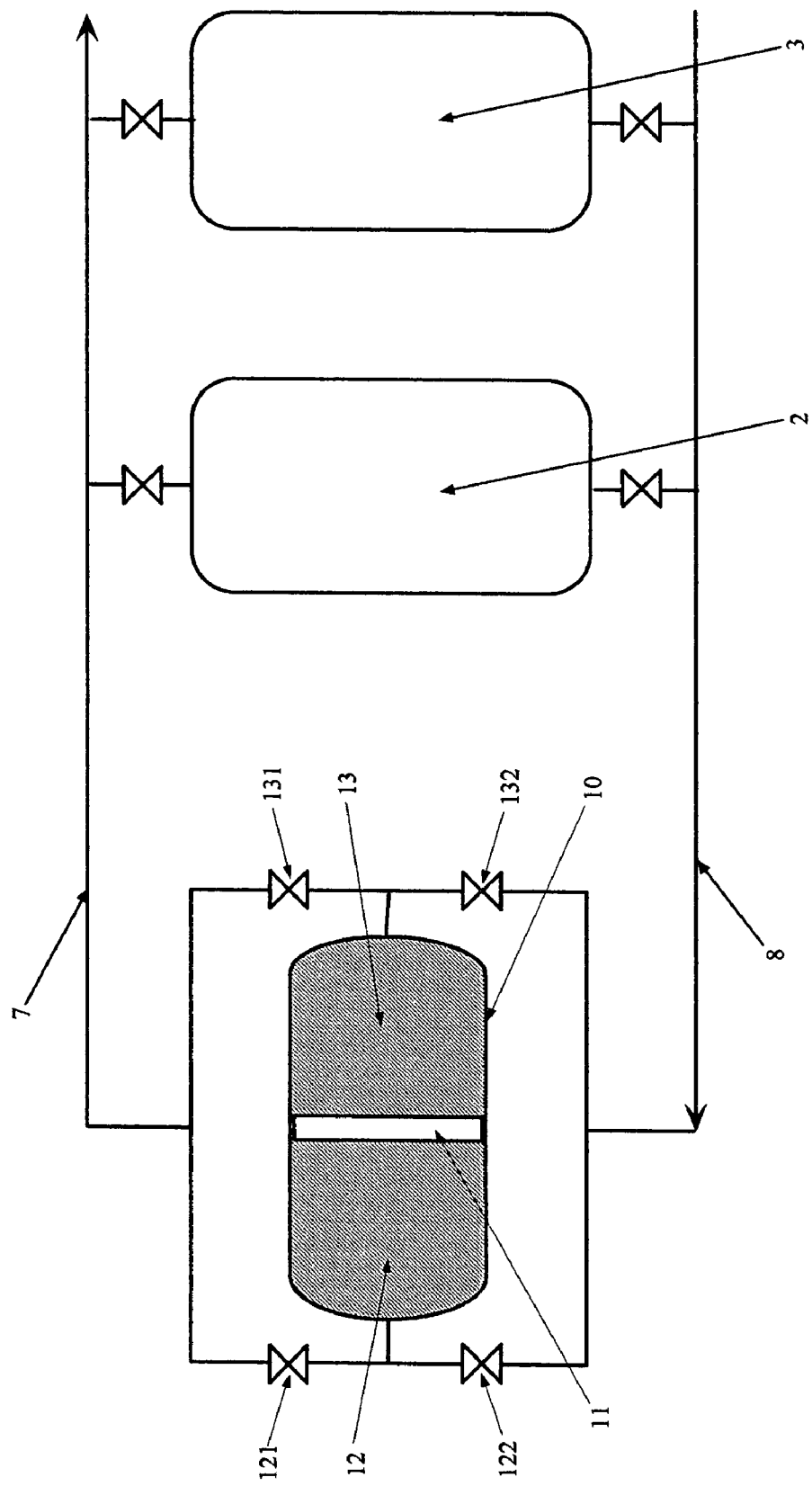
FIG. 2 is a schematic representation of the preferred embodiment of the thermal reservoir of the invention in a preferred location (parallel with boiler and chiller of the two-pipe hydronic air-conditioning system).

A schematic representation of the most preferred embodiment of the invention is shown in FIG. 2. In said embodiment a single storage tank 10 is provided. Said tank 10 will be constructed of materials capable of alternative storing hot (but less than boiling) water and cold (but above freezing water), at appropriate pressure (usually in the range of 10 to 150 pounds per square inch). In preference tank 10 will be well insulated so as to conserve the temperature of water therein over a long period of time. Tank 10 may be equipped with various means, known to those skilled in the art, for supplemental heating or cooling of water stored therein, so as to maintain hot or cold water stored therein at a desired hot or cold temperature indefinitely. Preferred is a reversible heat pump which may alternatively heat or cool the water in tank 10.

In the preferred embodiment of the invention tank 10 will be sized to have a water storage capacity which closely approximates the volume of the water which circulates in supply line 7, return line 8 and water-to-air heat exchangers 6 when the two-pipe hydronic air-conditioning system is in operation. Depending on the size of the two-pipe hydronic system, this will usually be in a range from several hundred, to several thousands of gallons of water.

In the preferred embodiment of the invention (FIGS. 2, 3 and 4) tank 10 will be cylindrical in shape, have a longitudinal axis terminating at two ends (for descriptive purposes respectively called hot end 12 and cold end 13 herein) and be equipped with piston 11 movably disposed along said longitudinal axis of tank 10. While in the figures herein piston 11 is shown as a flat disc, those skilled in the art will recognize that a piston may take many shapes, including but not limited to convex, concave or complex ends, or even be spherical in shape, all of which are comprehended by the invention disclosed and claimed herein. In addition each end (namely hot end 12 and cold end 13) of tank 10 will be equipped with a port capable of receiving and discharging water through piping attached thereto. Movably disposed piston 11 thereby divides tank 10 into two variably sized sections. While either section of tank 10 might be connected to receive either hot or cold water, in practice once connected a particular end receives either hot or cold water, thus for purpose of discussing the invention herein disclosed are called "hot end" 12 or "cold end" 13 as mentioned above. As described herein hot end 12 is used to receive therein and discharge hot water therefrom and cold end 13 is used to receive therein and discharge cold water therefrom.

Figure 3:
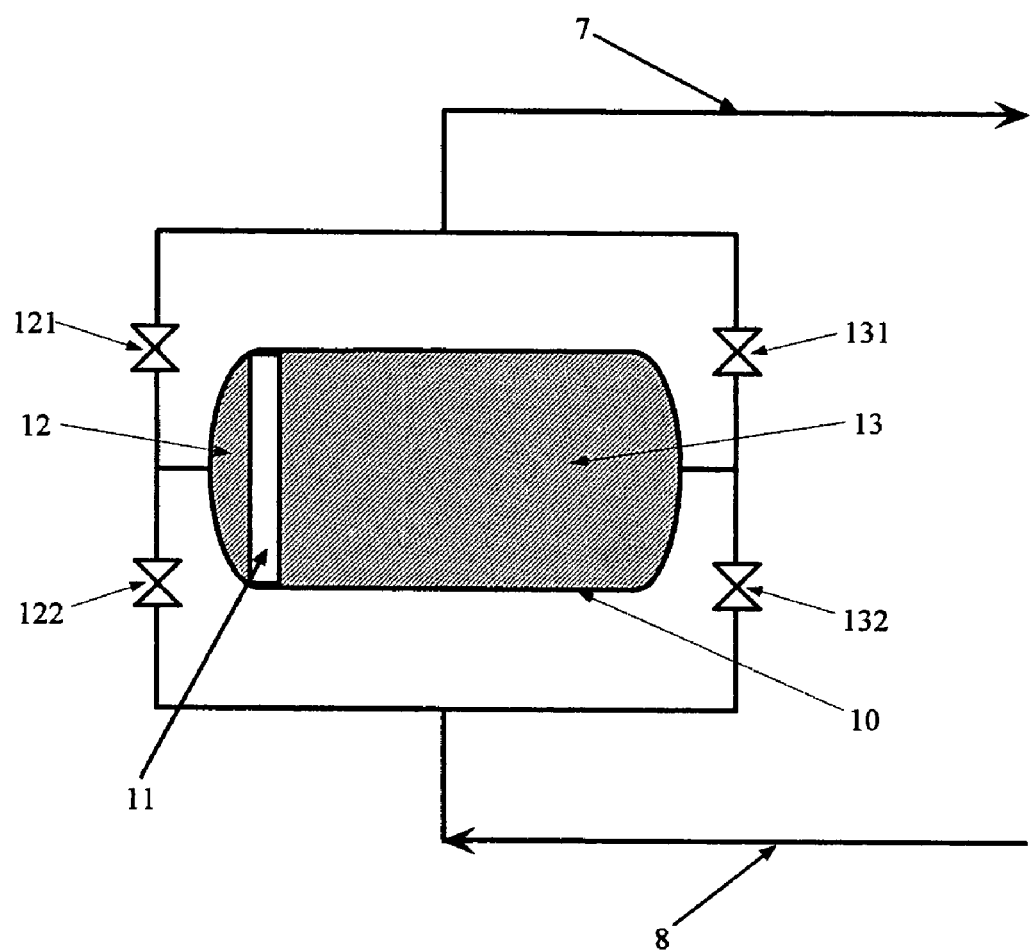
FIG. 3 is a schematic r presentation of the preferred embodiment of the thermal reservoir of FIG. 2 of the invention when the two-pipe hydronic air-conditioning system is in the heating mode (cold water is contained in said thermal reservoir).

FIG. 2 represents disposition of tank 10 at a preferred location in the two-pipe hydronic air-conditioning system which it serves, namely in parallel connection with boiler 2 and chiller 3 of said two-pipe hydronic air-conditioning system. Referring further to FIG. 2, hot end supply valve 121, hot end return valve 122, cold end supply valve 131 and cold end return valve 132 are used to control admittance and discharge of water to and from hot end 12 and cold end 13 of tank 10. In "normal" positions (that is when the system is running, in either heating or cooling mode, not undergoing transition between said modes) all four of said valves will be closed and pump 4 will cause water to be circulated through either boiler 2 or chiller 3 through supply line 7, water-to-air heat exchangers 6 and return line 8. If the two-pipe hydronic air-conditioning system is in the heating mode then piston 11 will be near the hot end 12 of tank 10, cold end 13 will be enlarged and tank 10 will substantially contain cold water, as is shown in FIG. 3. If, on the other hand, the two-pipe hydronic air-conditioning system is in the cooling mode then piston 11 will be near the cold end 13 of tank 10, hot end 13 will be enlarged and tank 10 will substantially contain hot water, as is shown in FIG. 4.

FIG. 3 shows the position of piston 11 of tank 10 when a two-pipe hydronic air-conditioning system is in the heating mode. In such mode boiler 2 is in service and hot water, about 180 Degrees Fahrenheit is being circulated from boiler 2, through supply line 7, through water-to-air heat exchangers 6, through return line 8 and back through boiler 2. In such mode piston 11 of tank 10 is shifted toward the hot end 12 of tank 10, cold end 13 of tank 10 is expanded by virtue of piston 11 being shifted as said and contains cold water of about 40 Degrees Fahrenheit. To switch the two-pipe hydronic air-conditioning system from heating to cooling modes cold water is to be drawn from from cold end 13 of tank 10 and is used to displace hot water circulating in the two-pipe hydronic air-conditioning system (namely supply line 7, water-to-air heat exchangers thereof and return line 8) into the other, or hot water end 12, of tank 10. To do so boiler 2 will typically be taken out of service and cold end supply valve 131 and hot end return valve 122 opened. Opening valve 131 allows cold water, in cold end 13 of tank 10 to be drawn into pump 4 (see FIG. 1) and into supply line 7. Opening valve 122 allows hot water, within the piping (supply line 7 and return line 8) and water-to-air heat exchangers 6 to flow into hot end 12 of tank 10. Accordingly cold water from cold end 12 of tank 10 displaces hot water within the piping (supply line 7 and return line 8) and water-to-air heat exchangers 6 into hot end 13 of tank 10. As cold water is withdrawn from cold end 13 of tank 10 and hot water is introduced into hot end 13 of tank 10, piston 11 of tank 10 will shift towards cold end 13 of tank 10, therefore at the end of the process be in the position shown in FIG. 4. The end of said shifting process may be determined by a plurality of ways, including switches, timers, stoppage of water flow (which may be detected by increase in system pressure) when piston 11 of tank 10 has shifted fully and flow of hot water into hot end 13 stops, or by temperature change of return line 8 near tank 10 (that is, when all the hot water has passed and said line changes from hot to cold). When substantially all of the hot water is displaced from the system and to hot end 12 of tank 10, cold water supply valve 131 and hot water return valve 122 is closed, and chiller 3 placed into service. At this time cold water will already be in the piping (supply line 7 and return line 8) and water-to-air heat exchangers 6 of the system. It will not be necessary for the chiller to consume substantial quantities of energy to bring the temperature of the water in the system to efficient cooling temperature (typically about 40 Degrees Fahrenheit). Immediate cooling of the air of the building may commence. In addition thereto, hot water removed from the system has been stored for subsequent use when the system is later switched back to heating mode, thereby conserving the energy which was used to heat said water. Thereby switching the two-pipe hydronic air-conditioning system from heating to cooling may be accomplished in a facile, speedy manner, with substantially no waste of energy (the only energy used in switching over, as aforesaid, is the amount on energy consumed by pump 4 to pump stored cold water into the system and displace hot water from the system into storage).

Figure 4:
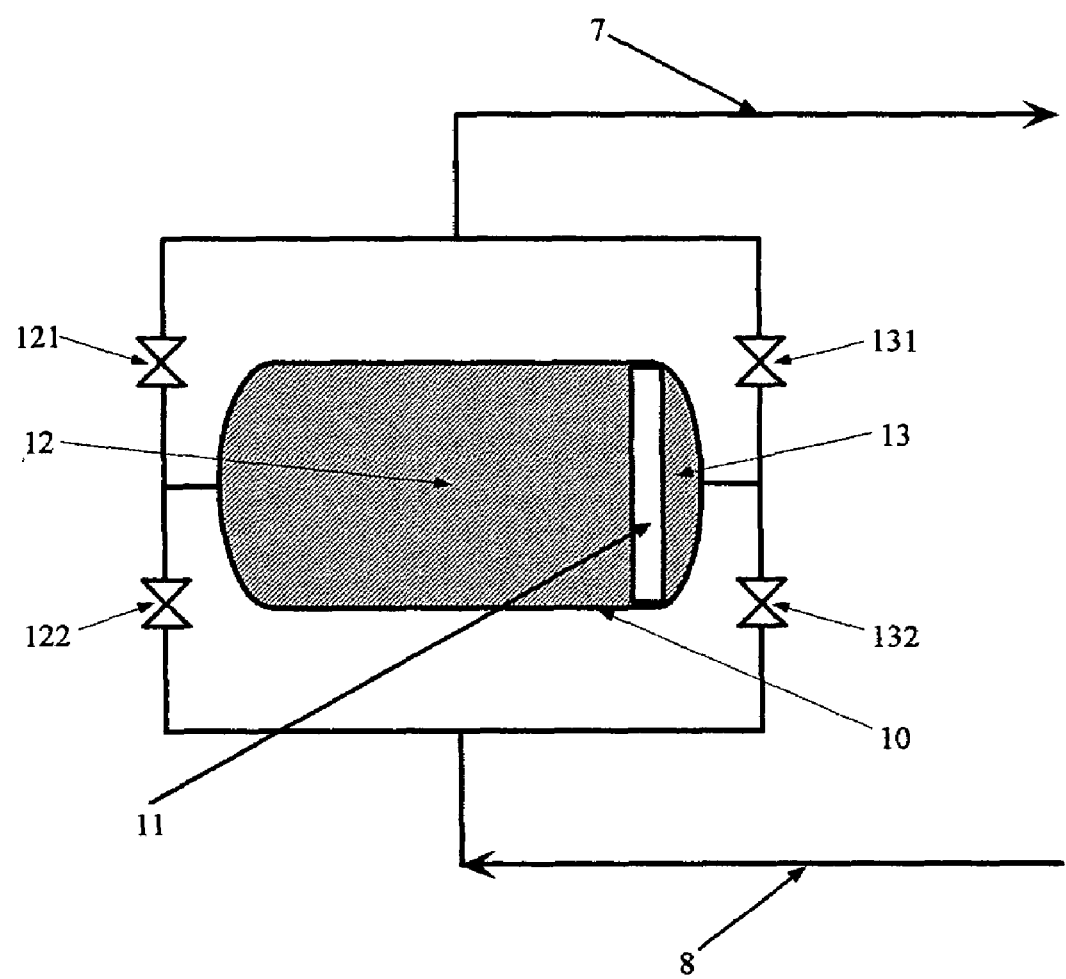
FIG. 4 is a schematic representation of the preferred embodiment of the thermal reservoir of FIG. 2 of the invention when the two-pipe hydronic air-conditioning system is in the cooling mode (hot water is contained in said thermal reservoir).

Referring now to FIG. 4 it is seen that the process described above is a fully reversible one, that is, the invention may also be used to switch a two-pipe hydronic air-conditioning system from cooling mode to heating mode, with speed and energy efficiency. FIG. 4 represents the position of piston 11 of the preferred embodiment of the invention when the two-pipe hydronic air-conditioning system which it serves is in the cooling mode. In such mode, chiller 3 is in service and pump 4 is therefore circulating cold water through supply line 7, water-to-air heat exchangers 6 and return line 8 of the two-pipe hydronic air-conditioning system. Hot water (previously withdrawn from the system, as above) is stored in tank 10 (at hot end 12 of tank 10). Hot end supply valve 121, hot end return valve 122, cold end supply valve 131 and cold end return valve 132 will all typically be closed. In order to switch the two-pipe hydronic air-conditioning system from cooling to heating mode, chiller 3 will be taken out of service and hot end supply valve 121 and cold end return 132 valve opened. This will cause pump 4 to draw hot water from the hot end 13 of tank 10 into supply line 7, water-to-air heat exchangers 6 and return line 8, thereby displacing water cold water therefrom, through cold end return valve 132 and in to cold end 13 of tank 10. Removing hot water from hot end 12 of tank 10 and injecting cold water into cold end 13 of tank 10 causes piston 11 to shift toward the hot end 12 of tank 10. That action increases the size of cold end 13 of tank 10, enabling it to receive all of the cold water removed from the system. Upon removal of all the cold water from the system hot end supply valve 121 and cold end return valve 132 are closed, and boiler 2 placed in service. At this time hot water is already in the piping and water-to-air heat exchangers of the two-pipe hydronic air-conditioning system, the air of the building serviced thereby may be immediately warmed, the boiler need not be run for a substantial length of time (consuming substantial quantity of energy in the process) to heat water of the system to proper operating temperature (typically about 180 Degrees Fahrenheit); and, cold water previously in the system has been placed in cold storage (thereby the energy used to chill the water has been conserved).

It is therefore seen that the invention herein disclosed may be employed both to switch a two-pipe hydronic air-conditioning system from heating to cooling, or from cooling to heating, in a simple and facile manner, rapidly, and without waste of energy.

Those skilled in the art will recognize various permutations, alternatives and/or modifications may be made in respect to the preferred embodiment of the invention, including but not necessarily limited to where in the two-pipe hydronic air-conditioning system it may be placed, the use of other containers such as a bladder instead of a tank of rigid structure to form a water reservoir, the number of a plurality of tanks, bladders or other containers used to constitute a thermal reservoir, the use of an elastic bladder rather than piston to divide tanks, bladders or other containers into separate compartments for storage of hot and cold water without mixing thereof, and the use of separate containers for storage of hot and cold water. Such alternatives, permutation and/or modifications being obvious to those skilled in the art from the disclosure herein made, said alternatives, permutations and/or modifications are comprehended by the invention herein disclosed and claimed.

Figure 5:
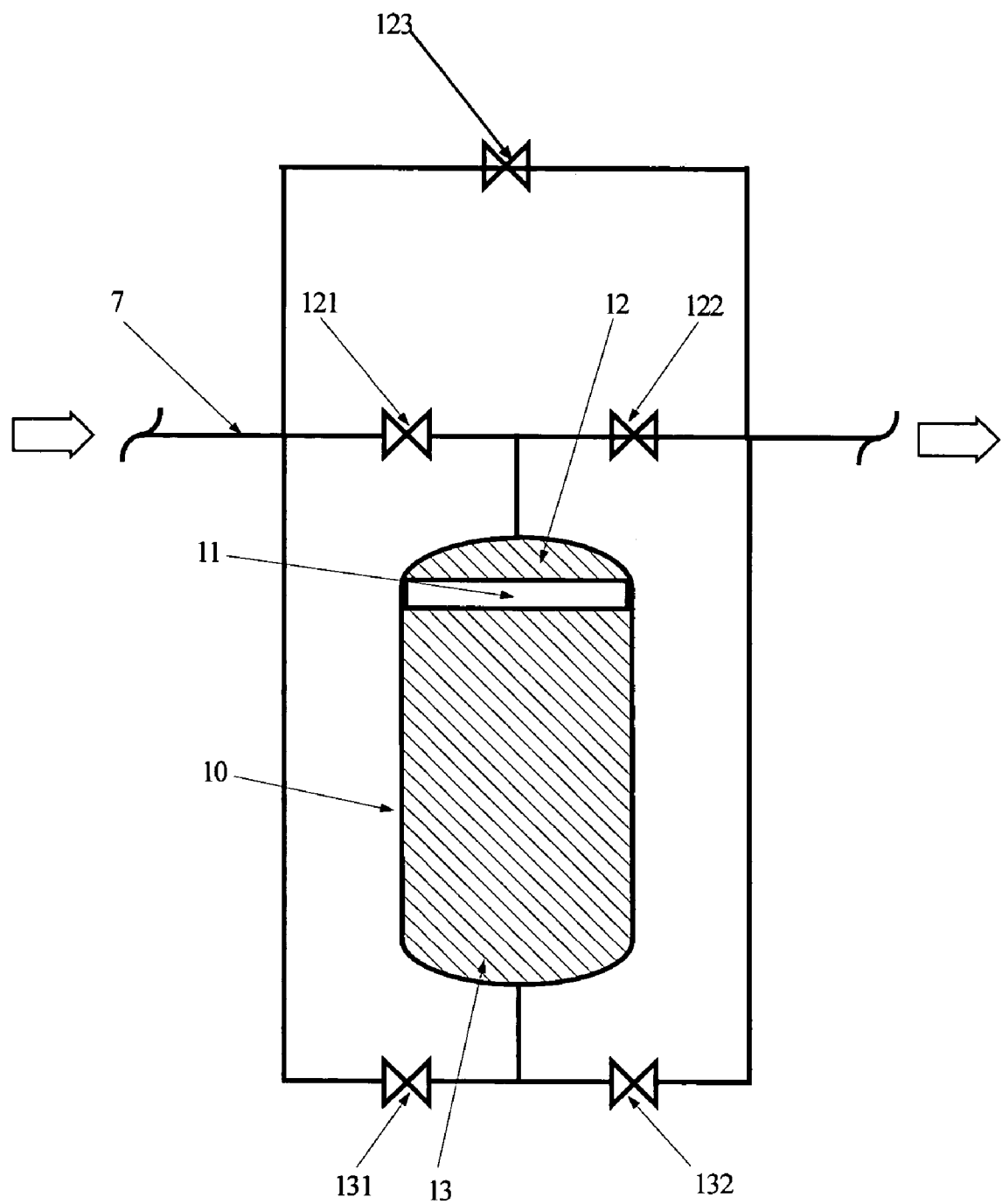
FIG. 5 is a schematic representation of the thermal reservoir of the invention as disposed in the supply line of the two-pipe hydronic air-conditioning system.

For instance, those skilled in the art will recognize that instead of the thermal reservoir of the invention being disposed in parallel connection with boiler 2 and chiller 3, same might be disposed "in line," in either supply line 7 or return line 8. FIG. 5 illustrates placement of the thermal reservoir valves within supply line 7 of the two-pipe hydronic air-conditioning system. The same arrangement would apply if said thermal reservoir and associated valves were installed in return line 8. In such arrangement hot water supply valve 121, hot water return valve 122, cold water supply valve 131 and cold water return valve 132, boiler 2 and chiller 3 would all be operated as described above. The one difference between placement of the thermal reservoir of the invention in parallel arrangement with boiler 2 and chiller 3 (as is illustrated in FIGS. 2,3 and 4) and connection in series with supply line 7 (or return line 8) relates to by-pass valve 123, which allows circulation of hot or cold water about the loop (including supply line 7, water-to-air heat exchangers 6, and return line 8) of the two-pipe hydronic air-conditioning system when all four of the other valves shown in FIG. 5 (namely hot water supply valve 121, hot water return valve 122, cold water supply valve 131 and cold water return valve 132) are all closed (thereby fluidly isolating water in tank 10 from the remainder of the system). Accordingly these embodiments of the invention are intended to be comprehended and claimed.

Figure 6:
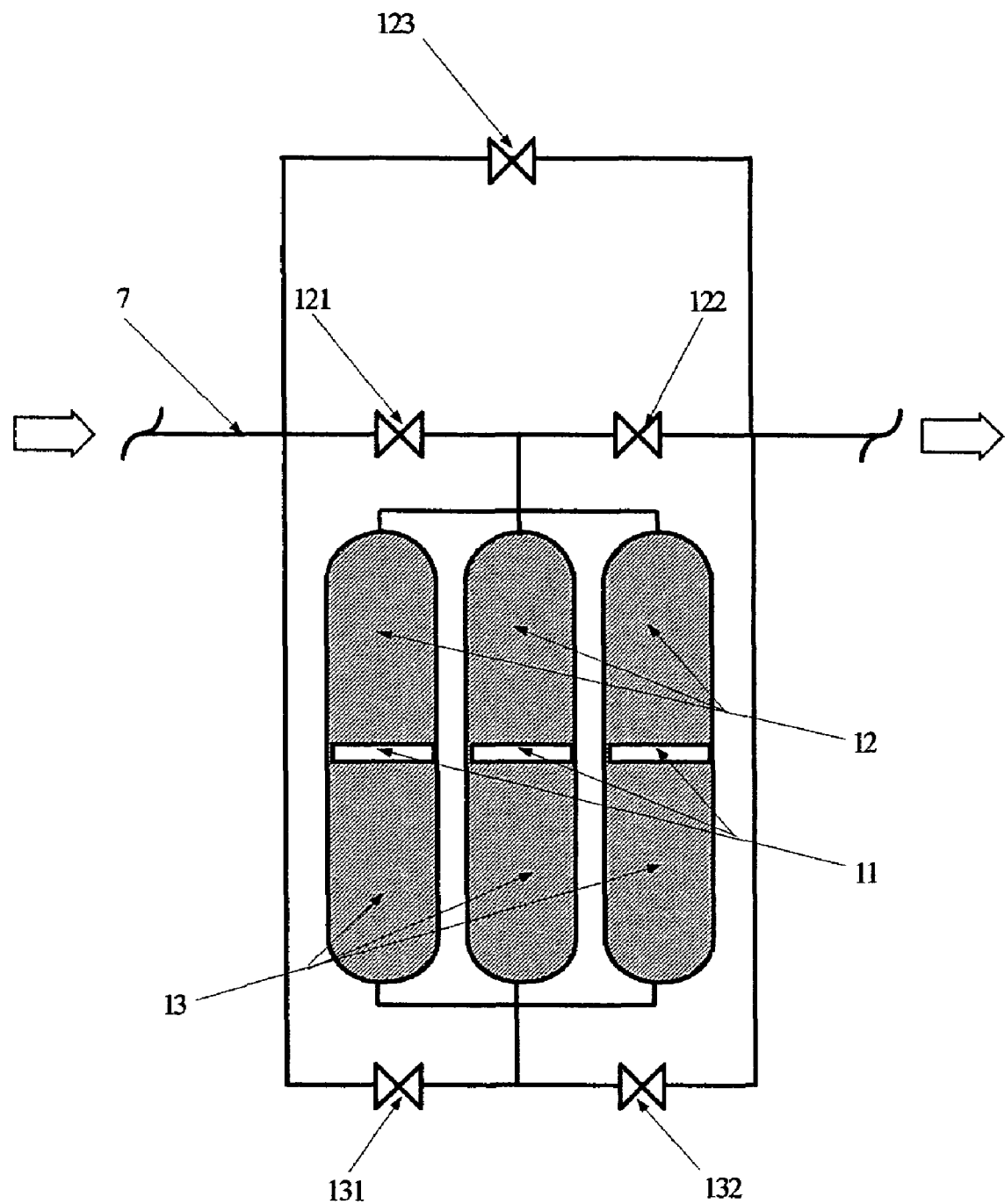
FIG. 6. is a schematic representation of an alternative embodiment of the thermal reservoir of the invention having a plurality of pistons containing tanks.

FIG. 6 illustrates a modification of the invention seen in FIG. 5 above. In FIG. 6 multiple tanks connected in parallel arrangement to each other may be used in lieu of single tank 10, illustrated in FIGS. 2, 3, 4 and 5. In FIG. 6 the thermal reservoir of the invention is installed "in line" of supply line 7. It will be obvious to those skilled in the art that it could as equally well be installed within return line 8, and that a similar arrangement of a plurality of tanks of small r capacity may be used as a substitute for a single tank of larger capacity, whether the invention herein disclosed is installed in parallel with boiler 2 and chiller 3, or in series connection, within supply line 7 or return line 8 as discussed herein. Accordingly these embodiments of the invention are intended to be comprehended and claimed.

Figure 7:
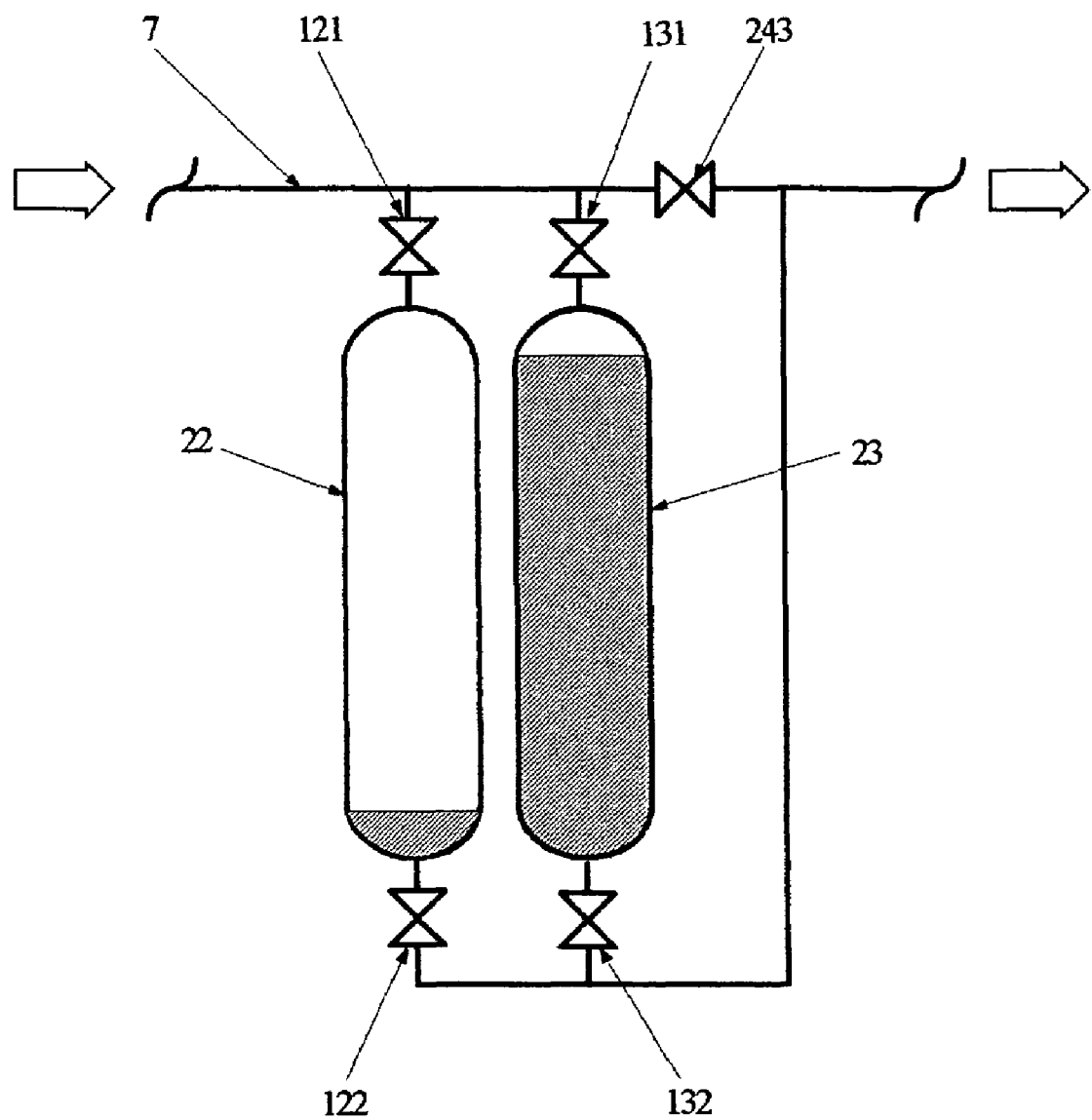
FIG. 7 is a schematic representation of another alternative embodiment of the invention employing use of separate tanks for hot and cold water storage.

As mentioned above, there are other embodiments of the invention possible. Only some of them can be illustrated herein. FIG. 7 illustrates the invention using two separate tanks, one of which 22 is dedicated to store hot water, and the other of which 23 is dedicated to the storage of cold water. In this embodiment, tanks 22 and 23 would have a vent for the admission of air to the upper portion of the tank in order for water to be drawn therefrom. In operation of this embodiment of the invention by-pass valve 243 is normally open (that is when the two-pipe hydronic air-conditioning system is in either heating or cooling modes, not being switched from one mode to the other). When it is necessary to switch modes valve 243 is closed and valves either hot water supply valve 121 and cold water return valve 131 or cold water supply valve 132 and hot water return valve 122 are opened to withdraw water from the appropriate tank and direct water withdrawn from the system into the opposite tank.

Figure 8:
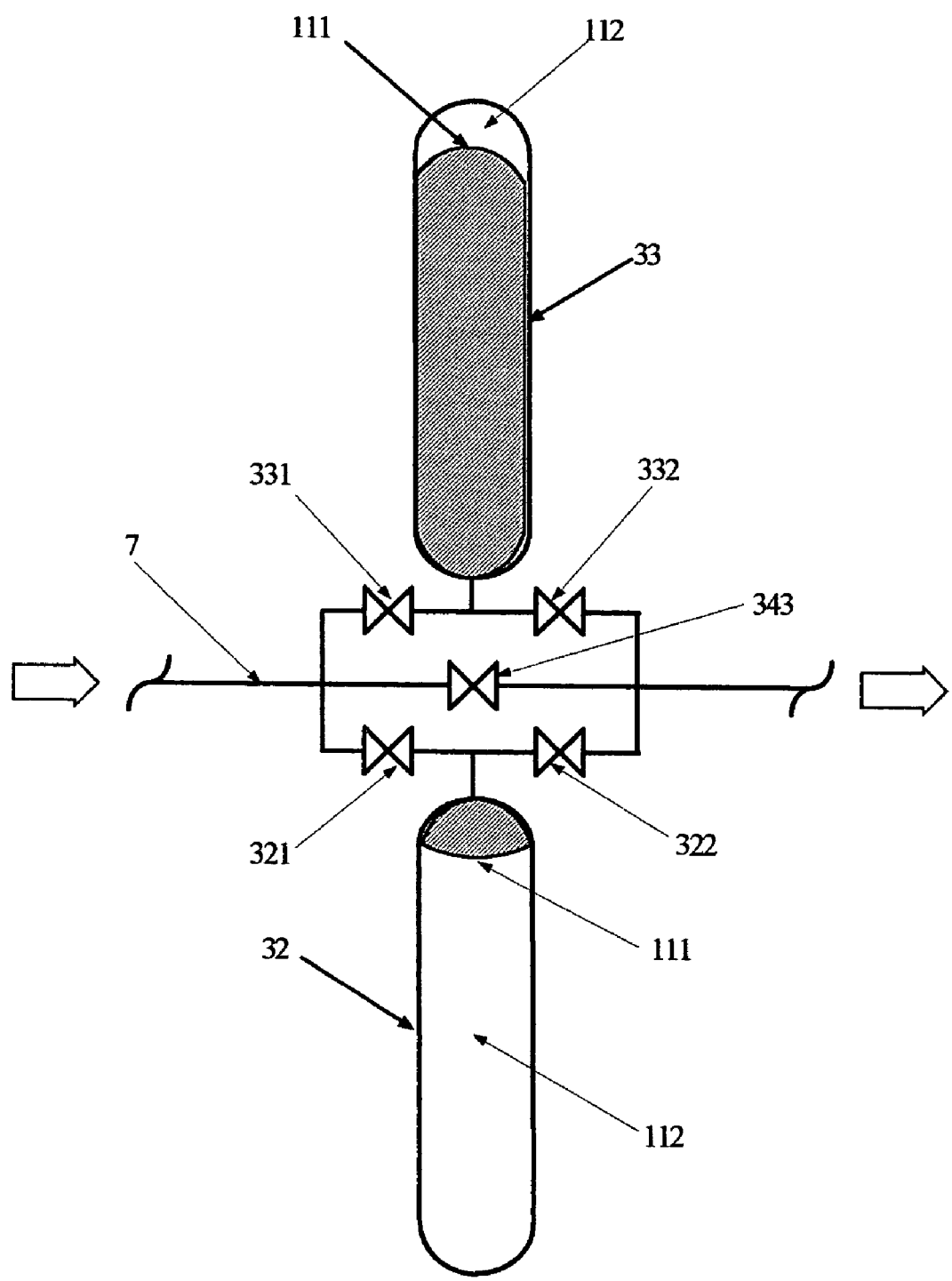
FIG. 8 is a schematic representation of another alternative embodiment of the invention employing use of a flexible bladder in the tanks containing gas pressure.

FIG. 8 shows yet another permutation of the present invention. In said permutation two separate tanks, 32 and 33 are used, one for the storage of hot water, the other for the storage of cold water. In this permutation, tanks 32 and 33 are equipped with elastic bladders 111, having gas pressure outside thereof. Accordingly a filled tank is charged (through valve 321 or 331) with water under the pressure of the discharge pressure of pump 4 (see FIG. 1). By closing by-pass valve 343 said pressure is released (through either valve 322 or 332) to a lower pressure (downstream of valve 343, which is effectively the suction pressure of pump 4).

Those skilled in the art will recognize that the invention disclosed herein may be subject to many other modifications which do not depart substantially therefrom, thus are comprehended thereby. For instance, those skilled in the art will recognize that in lieu of a piston, tank 10 might employ one or more bladders to separate tank 10 into two variable volume sections.

The invention is simple and easy to use. While operation of the various valves and/or pumps may be accomplished by manual means, in preference they will automatically be operated by or in conjunction with means that are used to perform various other functions associated with switching a two-pipe hydronic system between modes (such as switching the boiler or chiller in and out of service). Those skilled in the art will recognize many electric, hydraulic and/or pneumatic controls whereby such automatic operation can be accomplished, and are comprehended by the invention disclosed herein.

While the above description contains many specificities, these should not be construed as limitations on the scope of the invention, but rather as an exemplification of one preferred embodiment thereof. Accordingly, the scope of the present invention should be determined not by the embodiment(s) illustrated, but by the appended claims and their legal equivalents.

What is claimed is:

1. A thermal reservoir for a two-pipe hydronic air-conditioning system which said two-pipe hydronic air-conditioning system contains a volume of water, means to condition the temperature of said volume of water having a first end and a second end, a pump to circulate said water about a piping loop containing a supply line and a return line and a plurality of water-to-air heat exchangers connected to said supply line and to said return line of said loop, comprising:
   a. tank means having a first portion and a second portion which are fluidly separated from each other;
   b. first valve means having first end and second end;
   c. second valve means having first end and second end;
   d. third valve means having first end and second end;
   e. fourth valve means having first end and second end;
   f. first pipe means connecting said first portion of said tank to said first end of said first valve means;
   g. second pipe means connecting said second end of said first valve means to said first end of said second valve means;
   h. third pipe means connecting said second end of said second valve means to said second portion of said tank;
   i. fourth pipe means connecting said first portion of said tank to said first end of said third valve means;
   j. fifth pipe means connecting said second end of said third valve means to said first end of said fourth valve means;
   k. sixth pipe means connecting said second end of said fourth valve means to said second portion of said tank;
   l. seventh pipe means connecting said second pipe means to a first portion of the piping loop of said two-pipe hydronic air-conditioning system; and
   m. eighth pipe means connecting said fifth pipe means to a second portion of the piping loop of said two-pipe hydronic air-conditioning system.

2. The thermal reservoir of claim 1 wherein said tank means is comprised of a cylindrically shaped tank having a first end, a second end, a longitude disposed therebetween, and a piston movably disposed along said longitude of said tank.

3. The thermal reservoir of claim 2 wherein said thermal reservoir is comprised of a plurality of tanks fluidly connected in parallel, each of which said tanks is cylindrically shaped, has a first end, a second end, a longitude disposed therebetween and a piston movably disposed along said longitude thereof.

4. The thermal reservoir of claim 1 wherein said tank means is divided into said first and second portions thereof by an elastic membrane.

5. The thermal reservoir of claim 1 wherein said second pipe means is fluidly connected to one of said ends of said means to condition the temperature of said volume of water of said two-pipe hydronic air-conditioning system and said fifth pipe means is fluidly connected to the other of said ends of said means to condition the temperature of said volume of water of said two-pipe hydronic air-conditioning system.

6. The thermal reservoir of claim 2 wherein said second pipe means is fluidly connected to one of said ends of said means to condition the temperature of said volume of water of said two-pipe hydronic air-conditioning system and said fifth pipe means is fluidly connected to the other of said ends of said means to condition the temperature of said volume of water of said two-pipe hydronic air-conditioning system.

7. The thermal reservoir of claim 3 wherein said second pipe means is fluidly connected to one of said ends of said means to condition the temperature of said volume of water of said two-pipe hydronic air-conditioning system and said fifth pipe means is fluidly connected to the other of said ends of said means to condition the temperature of said volume of water of said two-pipe hydronic air-conditioning system.

8. The thermal reservoir of claim 4 wherein said second pipe means is fluidly connected to one of said ends of said means to condition the temperature of said volume of water of said two-pipe hydronic air-conditioning system and said fifth pipe means is fluidly connected to the other of said ends of said means to condition the temperature of said volume of water of said two-pipe hydronic air-conditioning system.

9. The thermal reservoir of claim 1 wherein said thermal reservoir is fluidly connected in series with a portion of said supply line of said two-pipe hydronic air-conditioning system.

10. The thermal reservoir of claim 2 wherein said thermal reservoir is fluidly connected in series with a portion of said supply line of said two-pipe hydronic air-conditioning system.

11. The thermal reservoir of claim 3 wherein said thermal reservoir is fluidly connected in series with a portion of said supply line of said two-pipe hydronic air-conditioning system.

12. The thermal reservoir of claim 4 wherein said thermal reservoir is fluidly connected in series with a portion of said supply line of said two-pipe hydronic air-conditioning system.

* * * * *